United States Patent [19]
Frost et al.

[11] 3,915,868
[45] Oct. 28, 1975

[54] NiO-SrF$_2$ RUBBING SEALS

[75] Inventors: Rodney I. Frost; Irwin M. Lachman, both of Corning; Roy E. Smith, Horseheads, all of N.Y.

[73] Assignee: Corning Glass Works, Corning, N.Y.

[22] Filed: Jan. 6, 1975

[21] Appl. No.: 538,913

[52] U.S. Cl. .................................................. 252/12
[51] Int. Cl.$^2$ ...................... C10M 5/00; C10M 7/00
[58] Field of Search ........... 252/12, 12.2, 12.4, 12.6

[56] References Cited
UNITED STATES PATENTS

| | | | |
|---|---|---|---|
| 3,370,006 | 2/1968 | Campbell et al. | 252/12 |
| 3,775,318 | 11/1973 | Lavik et al. | 252/12 |
| 3,836,466 | 9/1974 | Abe et al. | 252/12 |

*Primary Examiner*—Delbert E. Gantz
*Assistant Examiner*—I. Vaughn
*Attorney, Agent, or Firm*—Barry S. Bissell; Richard N. Wardell; Clarence R. Patty, Jr.

[57] ABSTRACT

Seal members having frictional coefficients of below about 0.30 with nominal wear when used against glass ceramic regenerators in gas turbine engines. Flame sprayed or sintered seals have a preferred analytical composition of 65–85% NiO and 15–35% SrF$_2$.

7 Claims, No Drawings

NiO-SrF$_2$ RUBBING SEALS

BACKGROUND OF THE INVENTION

Rotary regenerators for gas turbine engines are being made of ceramic and glass-ceramic materials capable of effective heat transfer at elevated temperatures. In particular, CERCOR cellular, glass-ceramic regenerators, made by Corning Glass Works and comprising beta-spodumene solid solution as the primary crystal phase, are being tested by the industry leaders.

Sealing members must be used in the gas turbine engine to separate the countercurrent gas flow paths and to seal the periphery of the rotary regenerator. The sealing members are preferably in rubbing contact with the regenerator and therefore must have a low coefficient of friction and good wear resistance thereon, as well as good sealing properties, at operating temperatures of at least about 750°C. An additional requirement eliminates many carbides, metal oxides and other potential materials; that requirement being that seal materials should not abrade or wear the ceramic regenerator.

The present invention presents a nickel oxide—strontium fluoride seal composition which exhibits a low frictional coefficient against the glass-ceramic regenerators and a nominal wear rate after long periods of rubbing contact with the rotating regenerator.

Prior experimenters have used seal compositions of nickel oxide and calcium fluoride, for example U.S. Pat. No. 3,481,715 discloses a composition of 55–85% nickel oxide, up to 10% calcium oxide, with the balance calcium fluoride. U.S. Pat. No. 3,370,006 discloses compositions of 75–95% nickel oxide and 5–25% calcium fluoride. the latter patent further suggests cobalt oxide as a replacement for the nickel oxide and materials selected from the group of lead monoxide, and the group IIa metal fluorides, phosphates and borates as replacements for the calcium fluoride. Strontium fluoride is, however, not specifically disclosed and the examples of nickel oxide seal compositions therein are limited to nickel oxide plus calcium fluoride, lead oxide, magnesium phosphate or calcium borate. Claims therein are drawn to nickel oxide plus various borates and phosphates and specifically to nickel oxide plus the fluorides of calcium, barium and magnesium. Strontium is again conspicuous by its absence from the recited fluorides and therefore the claim apparently teaches away from strontium fluoride.

The present inventors have found that, surprisingly, strontium fluoride together with nickel oxide actually produces a seal member composition with a lower frictional coefficient and an especially lower wear rate against rotating ceramic regenerators than the previously disclosed nickel oxide - calcium fluoride composition.

SUMMARY OF THE INVENTION

The invention, therefore, is a sintered or fused seal member having a composition analytically consisting essentially of nickel oxide and strontium fluoride in the percentage range of 50–95% NiO and 5–50% SrF$_2$. A preferred range for the seal composition is 65–85% NiO and 15–35% SrF$_2$.

The best NiO-SrF$_2$ seals are produced by calcining a raw material batch formulated to yield the desired composition at a temperature slightly above 1400°C, the melting point of the strontium fluoride, reducing the calcined batch to a powder and subsequently compacting and sintering or flame-spraying the powder. The precalcination of the raw material above the melting point of the fluoride results in grain growth of the nickel oxide phase. Especially in the higher nickel oxide compositions, this grain growth contributes to a more continuous, better bonded oxide phase in finished seal members. Preferred atmospheres for calcination and sintering are ones which are substantially devoid of water vapor.

Seal compositions of the present invention may be sintered or may be flame-sprayed onto suitable substrates, such as for example stainless steel base plates with undercoatings of nickel aluminide. Sintered seals have the advantage of being economically fabricated as thickly as necessary to outlast the useful life of the turbine engine. Plasma or flame sprayed coatings are generally quite thin because of the large cost of applying thicker coatings.

EXAMPLES OF THE PREFERRED EMBODIMENTS

EXAMPLE 1

NiO—SrF$_2$ Plasma Sprayed Compositions

A 400 gram batch of 74.6 wt.% nickel oxide, green, and 25.4 wt.% SrF$_2$ was wet ball milled with 1,1,1-trichloroethane 3% carbowax 4000 (trademark) binder, and 8 cc ricinoleic acid ceflocculant for four hours. After milling the batch was dried, granulated through a 12 Tyler mesh sieve and consolidated by pressing into convenient shapes. The batch was then calcined at about 1430°C (above the 1400°C melting temperature of SrF$_2$) in free flowing oxygen for six hours and crushed to about −140+325 Tyler mesh particle size.

Using a Metco type 3M plasma spray gun and feed unit the powder was then applied to a stainless steel substrate having a nickel aluminide undercoat thereon. Average thickness of the NiO—SrF$_2$ coating was 0.30 inches (7.6 mm).

The samples were then tested to determine their frictional coefficients when rubbing against a CERCOR regenerative matrix. In the test, a 9 inch (23 cm) diameter regenerator is mounted in a fixture and driven at 50 RPM. The sample seals are mounted in a holder and forced against the face of the matrix by an air cylinder with a constant pressure of 7 psi (0.5 Kg/cm$^2$). The matrix and the sample are contained in a small furnace wherein the temperature is 760°C. The force necessary to prevent rotation of the seal sample is measured by a load cell which is activated by a torque arm in communication with the sample holder. The frictional coefficient is then calculated using the force to prevent rotation, along with the area of contact and the applied load.

Wear rates are determined directly by direct measurement of the seal after a period of time.

Results of three seal samples made and tested as described above are shown below along with the last two seal samples which were plasma sprayed and tested as described above but without calcining the powder mixture of NiO and SrF$_2$.

| Composition (wt.%) | Coefficient of Friction ($\mu$ at 760°C.) | Seal Wear (mm/100 hours at 760°C.) |
|---|---|---|
| 74.6 NiO-25.4 SrF$_2$ | .33 | .0127 |
| 74.6 NiO-25.4 SrF$_2$ | .18 | .0152 |
| 74.6 NiO-25.4 SrF$_2$ | .21 | .0152 |
| 75.0 NiO-25.0 SrF$_2$ (not precalcined) | .35 | .0127 |
| 73.0 NiO-27.0 SrF$_2$ (not precalcined) | .33 | .0178 |

EXAMPLE 2

NiO—CaF$_2$ Compositions

NiO—CaF$_2$ compositions such as suggested in the prior art were fabricated for comparison with the NiO—SrF$_2$ compositions of the invention. The same calcining procedure as described in Example 1 was followed with regard to seal preparation and testing. The main composition however was 80 wt.% NiO-20 wt.% CaF$_2$ which corresponds by volume % to the 74.6 wt.% NiO-25.4 wt.% SrF$_2$ seal compositions of Example 1. The volume of phases in the fabricated seals has been found to be better means of comparing compositions. Some of the best results of testing are shown below.

| Composition (wt.%) | Coefficient of Friction ($\mu$ at 760°C.) | Seal Wear (mm/100 hours at 760°C.) |
|---|---|---|
| 80 NiO-20 CaF$_2$ | .33 | .0230 |
| 80 NiO-20 CaF$_2$ | .23 | .2800 |
| 75 NiO-25 CaF$_2$ | .35 | .0500 |

A sample of 75 wt.% NiO and 25 wt.% CaF$_2$ was additionally tested and showed slightly higher friction and intermediate wear compared with the higher oxide samples. All samples, however, displayed substantially higher wear and on the average a higher frictional coefficient than the NiO.SrF$_2$ samples.

EXAMPLE 3

Sintered Compositions

Batch compositions were prepared in the same manner as in Example 1 except that after calcining, the batches were reduced to −325 Tyler mesh particles, 3% binder was added, and the batches were granulated. Bars were then dry pressed and hydrostatically repressed at 20,000 psi (1406 Kg/cm$^2$) before firing at about 1380°C. for six hours in oxygen. The atmosphere could actually be any one which is substantially devoid of water vapor.

Compositions were made from nickel oxide plus each of the fluorides-calcium, strontium and barium. Friction and wear tests were conducted as in Example 1 with the results shown below for some of the best NiO—CaF$_2$ seals and one NiO—SrF$_2$ sample and one NiO—BaF$_2$ sample.

| Composition (wt.%) | Coefficient of Friction ($\mu$ at 760°C.) | Seal Wear (mm/100 hours at 760°C.) |
|---|---|---|
| 90 NiO-10 CaF$_2$ | .41 | 0.354 |
| 80 NiO-20 CaF$_2$ | .30 | 0.228 |
| 80 NiO-20 CaF$_2$ | .35 | 0.127 |
| 70 NiO-30 CaF$_2$ | .30 | 0.202 |
| 74.6 NiO-25.4 SrF$_2$ | .26 | 0.025 |
| 72.4 NiO-27.6 BaF$_2$ | .29 | 1.17 |

The 80 NiO-20 CaF$_2$, 74.6 NiO-25.4 SrF$_2$ and 72.4 NiO-27.6 BaF$_2$ all have 65 volume percent oxide and 35 volume percent fluoride compounds for comparison. The sample with SrF$_2$ has a slightly lower frictional coefficient than the other samples and, most importantly, has a significantly lower colar rate than the others.

We claim:

1. A rubbing seal for a gas turbine engine analytically consisting essentially of 50–95% by weight NiO and 5–50% by weight SrF$_2$.

2. The rubbing seal of claim 1 analytically consisting essentially of 65–85% NiO and 15–35% SrF$_2$.

3. The rubbing seal of claim 1 which comprises a melted and resolidified raw material batch yielding nickel oxide and strontium fluoride.

4. The method of fabricating a sintered seal member comprising the steps of
   a. intimately blending a batch of raw material analytically consisting essentially of 50–95% NiO and 5–50% SrF$_2$, by weight,
   b. calcining the batch at a temperature above the melting temperature of the SrF$_2$,
   c. reducing the calcine to a powder,
   d. pressing the calcined powder into seal member shapes, and
   e. firing the seal member shapes at a temperature and for a time sufficient to sinter the powder particles.

5. The method of claim 4 wherein the batch analytically consists essentially of 65–85% NiO and 15–35% SrF$_2$.

6. The method of claim 4 wherein the calcining temperature is between about 1400° and 1900°C. and the firing temperature of the seal shapes is between about 1400° and 1500°C.

7. The method of claim 6 wherein the batch analytically consists essentially of 65–85% NiO and 15–35% SrF$_2$.

* * * * *

UNITED STATES PATENT OFFICE
CERTIFICATE OF CORRECTION

PATENT NO. : 3,915,868
DATED : October 28, 1975
INVENTOR(S) : Rodney T. Frost, Irwin M. Lachman, Roy E. Smith It is certified that error appears in the above–identified patent and that said Letters Patent are hereby corrected as shown below:

Column 4, line 23, remove "colar" and insert -- wear -- .

Signed and Sealed this

Thirty-first Day of August 1976

[SEAL]

Attest:

RUTH C. MASON
*Attesting Officer*

C. MARSHALL DANN
*Commissioner of Patents and Trademarks*